United States Patent
Nagao et al.

(10) Patent No.: US 8,717,142 B2
(45) Date of Patent: May 6, 2014

(54) DOOR LOCK CONTROL APPARATUS FOR VEHICLE

(75) Inventors: Satoshi Nagao, Kariya (JP); Hironori Mitsubayashi, Chita-gun (JP); Daigo Akutsu, Gifu (JP); Taichi Yamaguchi, Obu (JP); Mitsuru Ogawa, Kariya (JP); Tomoo Kakegawa, Toyota (JP); Hiroko Murakami, Toyota (JP); Tomoyuki Funayama, Toyota (JP)

(73) Assignee: Denso Corporation, Aichi-Pref., Kariya (JP)

( * ) Notice: Subject to any disclaimer, the term of this patent is extended or adjusted under 35 U.S.C. 154(b) by 729 days.

(21) Appl. No.: 12/550,887

(22) Filed: Aug. 31, 2009

(65) Prior Publication Data

US 2010/0050713 A1 Mar. 4, 2010

(30) Foreign Application Priority Data

Sep. 2, 2008 (JP) ................. 2008-224976

(51) Int. Cl.
*G08C 19/00* (2006.01)

(52) U.S. Cl.
USPC .... 340/5.72; 340/5.61; 340/5.62; 340/426.36

(58) Field of Classification Search
USPC ............ 340/5.72, 5.61, 5.62, 426.36, 426.16, 340/426.28, 426.29
See application file for complete search history.

(56) References Cited

U.S. PATENT DOCUMENTS

| | | | | |
|---|---|---|---|---|
| 5,499,022 | A | * | 3/1996 | Boschini ...................... 340/5.62 |
| 5,912,631 | A | * | 6/1999 | Kusunoki ..................... 340/5.64 |
| 6,906,612 | B2 | * | 6/2005 | Ghabra et al. ............... 340/5.61 |
| 7,181,189 | B2 | | 2/2007 | Hotta et al. |
| 8,089,342 | B2 | | 1/2012 | Sugiura et al. |
| 2002/0030410 | A1 | | 3/2002 | Katou et al. |
| 2006/0279402 | A1 | * | 12/2006 | Okamitsu et al. ............ 340/5.62 |
| 2007/0120645 | A1 | * | 5/2007 | Nakashima ................... 340/5.61 |
| 2008/0157919 | A1 | * | 7/2008 | Sugiura et al. ............... 340/5.61 |

FOREIGN PATENT DOCUMENTS

| | | |
|---|---|---|
| JP | 3192715 | 5/2001 |
| JP | 3230469 | 9/2001 |
| JP | 2004-019380 | 1/2004 |
| JP | 3582384 | 8/2004 |
| JP | 2005-097860 | 4/2005 |
| JP | 2007107343 | 4/2007 |
| JP | 2007-217968 | 8/2007 |
| JP | 2007303254 | 11/2007 |
| JP | 2008-163633 | * 7/2008 |

OTHER PUBLICATIONS

Office Action mailed Nov. 16, 2012 in JP 2008-224976 with English translation.

* cited by examiner

*Primary Examiner* — Edwin Holloway, III
(74) *Attorney, Agent, or Firm* — Nixon & Vanderhye PC (57) ABSTRACT

A door lock control apparatus includes a lock switch on an exterior of a vehicle, a controller, and a check device. The controller performs a first key check in response to a lock command inputted through the lock switch. The first key check determines whether an electronic key specific to the vehicle is located outside around the vehicle based on a response from the key. The check device has previously performed a second key check, after the key has been put into a situation in which the key might have been moved from inside to outside the vehicle. The second key check determines whether the key is located inside the vehicle based on the response from the key. The check device stores a result of the second key check as a stored check record, which is then immediately available for checking when the controller responds to an inputted lock command.

6 Claims, 4 Drawing Sheets

DOOR LOCK CONTROL APPARATUS FOR VEHICLE

CROSS REFERENCE TO RELATED APPLICATION

This application is based on and incorporates herein by reference Japanese Patent Application No. 2008-224976 filed on Sep. 2, 2008.

TECHNICAL FIELD

The present exemplary embodiment relates generally to door lock control apparatus for a vehicle and, in particular, a door lock control apparatus for locking a door of a vehicle in response to a door lock command inputted through a door lock switch provided on the exterior of the vehicle under conditions where an user carrying an electronic key specific to the vehicle is located outside around the vehicle and where the electronic key is not located inside an occupant compartment of the vehicle.

BACKGROUND

As it is well known, in a smart entry system for a vehicle, a door of the vehicle is locked and unlocked by automatically detecting whether a user carrying an electronic key specific to the vehicle is approaching or coming away from the vehicle through wireless communication with the electronic key.

In such a smart entry system, if the door is fully automatically locked and unlocked regardless of a user's intention, problems may occur such as degradation in usability and an increase in time elapsed from when the user exits the vehicle to when the door is locked. As a result, the user may be anxious about whether the door is actually locked.

In a smart entry system disclosed in Japanese Patent No. 3582384, a user can manually input a door lock command through a lock switch (SW) provided on the exterior (e.g., near a door handle) of a vehicle in order to lock a door of the vehicle. A door of the vehicle is locked in response to an operation of the lock switch, if a door lock condition is met. The door lock condition is that an electronic key specific to the vehicle is located outside the vehicle and is not located inside the vehicle.

For example, a vehicle-interior/trunk-interior key check is performed to check whether the electronic key is not located inside the vehicle, and a vehicle-outside key check is performed to check whether the key is located outside the vehicle.

Figure 5:
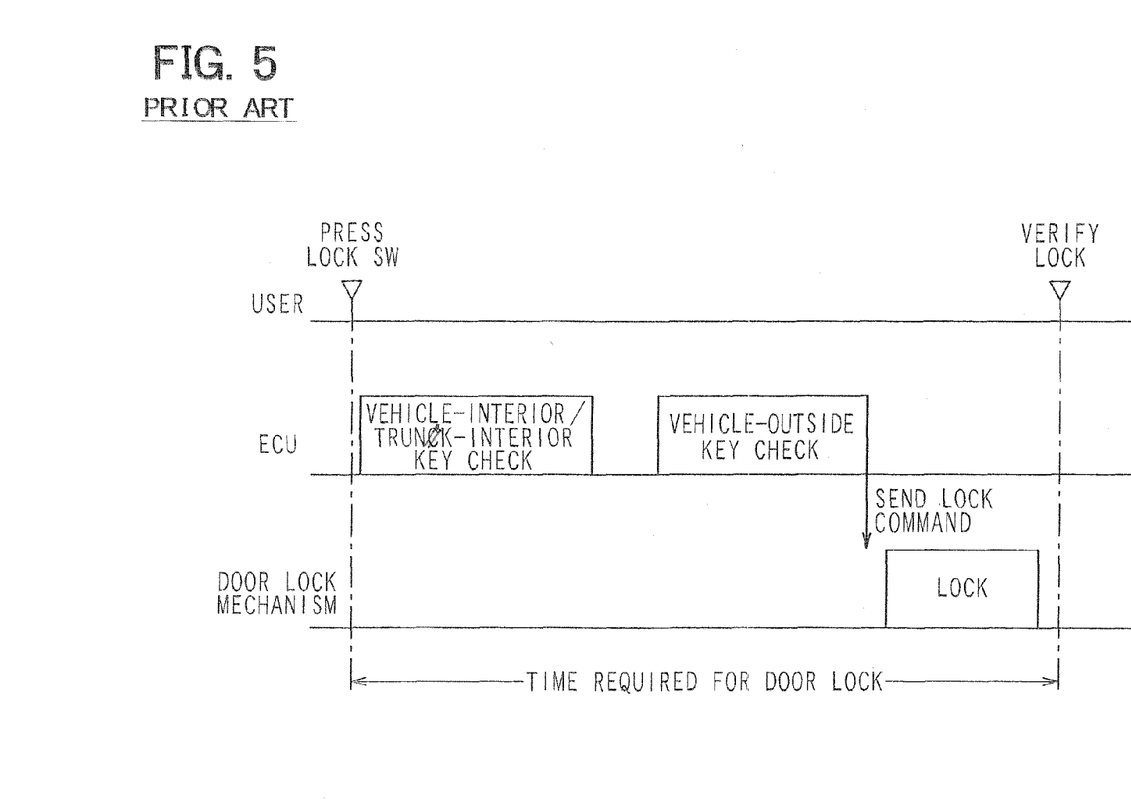
FIG. 5 is a timing diagram of a conventional door lock control apparatus.

Such a key check procedure to determine whether the door lock condition is met is performed to prevent the door from being locked with the electronic key left inside the vehicle. As shown in FIG. 5, the key check procedure starts after the lock SW is pressed down.

Therefore, it takes much time to verify the door is locked after pressing down the lock SW.

BRIEF SUMMARY

In view of the above, it is an object of the present exemplary embodiment to provide a door lock control apparatus for reducing time required to verify a vehicle door is locked after a door lock switch on an exterior of the vehicle is operated.

A door lock control apparatus for a vehicle includes a lock switch, a door lock control device, and a vehicle-interior check device. The lock switch is located on an exterior of the vehicle and configured to be manually operable to input a door lock command. The door lock control device performs a vehicle-outside key check in response to the door lock command. In the vehicle-outside key check, a wireless signal is transmitted outside around the vehicle, and it is determined whether an electronic key specific to the vehicle is located outside around the vehicle based on a response signal from the electronic key. The vehicle-interior check device performs a vehicle-interior key check when the electronic key is put into a situation in which the electronic key is allowed to be moved from inside to outside an occupant compartment of the vehicle. In the vehicle-interior key check, the wireless signal is transmitted inside the occupant compartment, and it is determined whether the electronic key is located inside the occupant compartment based on the response signal from the electronic key. The vehicle-interior check device stores a result of the vehicle-interior key check as a check record. The door lock control device determines, based on the check record, whether the electronic key is located inside the occupant compartment in response to the door lock command. The door lock control device locks a door of the vehicle upon determination that the electronic key is not located inside the occupant compartment, and that the electronic key is located outside around the vehicle.

BRIEF DESCRIPTION OF THE DRAWINGS

The above and other objectives, features and advantages of the present exemplary embodiment will become more apparent from the following detailed description made with check to the accompanying drawings. In the drawings.

DETAILED DESCRIPTION OF THE PREFERRED EMBODIMENT

Figure 1:
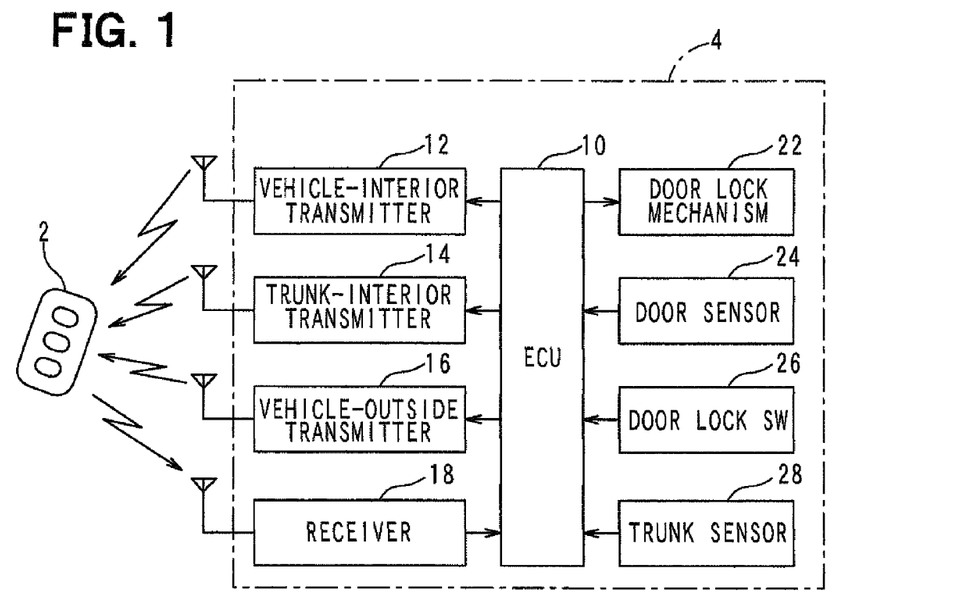
FIG. 1 is a block diagram of a door lock control apparatus according to an embodiment of the present invention.

A door lock control apparatus according to an embodiment of the present invention is described below with reference to FIG. 1.

The door lock control apparatus includes an electronic key 2 carried by a user (e.g., driver) and an in-vehicle device 4 mounted to a vehicle. When receiving a call signal wirelessly transmitted from the in-vehicle device 4, the electronic key 2 transmits a response signal corresponding to the call signal.

The in-vehicle device 4 mainly includes a control electronic control unit (ECU) 10. The control ECU 10 performs wireless communication with the electronic key 2 to lock/unlock a door of the vehicle.

The control ECU 10 is connected to each of a vehicle-interior transmitter 12, a trunk-interior transmitter 14, a vehicle-outside transmitter 16, and a receiver 18. The vehicle-interior transmitter 12 transmits the call signal inside to an occupant compartment of the vehicle. The trunk-interior transmitter 14 transmits the call signal inside a trunk of the vehicle. The vehicle-outside transmitter 16 transmits the call signal to the outside of the vehicle. For example, the call signal transmitted by the vehicle-outside transmitter 16 can be effective within a predetermined distance from the vehicle. The receiver 18 receives the response signal from the electronic key 2.

The control ECU 10 transmits the call signal through the transmitters 12, 14, and 16 and receives the response signal from the electronic key 2 through the receiver 18. The control ECU 10 detects a location of the electronic key 2 by determining whether the received response signal is authorized.

The control ECU 10 is further connected to a trunk sensor 28, a door lock mechanism 22, a door sensor 24, and a door lock switch 26. The trunk sensor 28 detects whether the trunk of the vehicle is opened or closed. The door lock mechanism 22 locks/unlocks the door of the vehicle. The door lock switch 26 is provided on the exterior of the vehicle so that the user can access the door lock switch 26 from the outside of the vehicle. The door lock mechanism 22, the door sensor 24, and the door lock switch 26 are provided for each door of the vehicle.

When any one of the door lock switches 26 is operated (e.g., pressed down), the control ECU 10 determines whether a door lock condition is met based on the detected location of the electronic key 2. If the door lock condition is met, the control ECU 10 sends to the door lock mechanism 22 a door lock command that causes the door lock mechanism 22 to lock the door of the vehicle.

Control processes performed by the control ECU 10 to determine whether the door lock condition is met are described below with reference to FIGS. 2 and 3.

Figure 2:
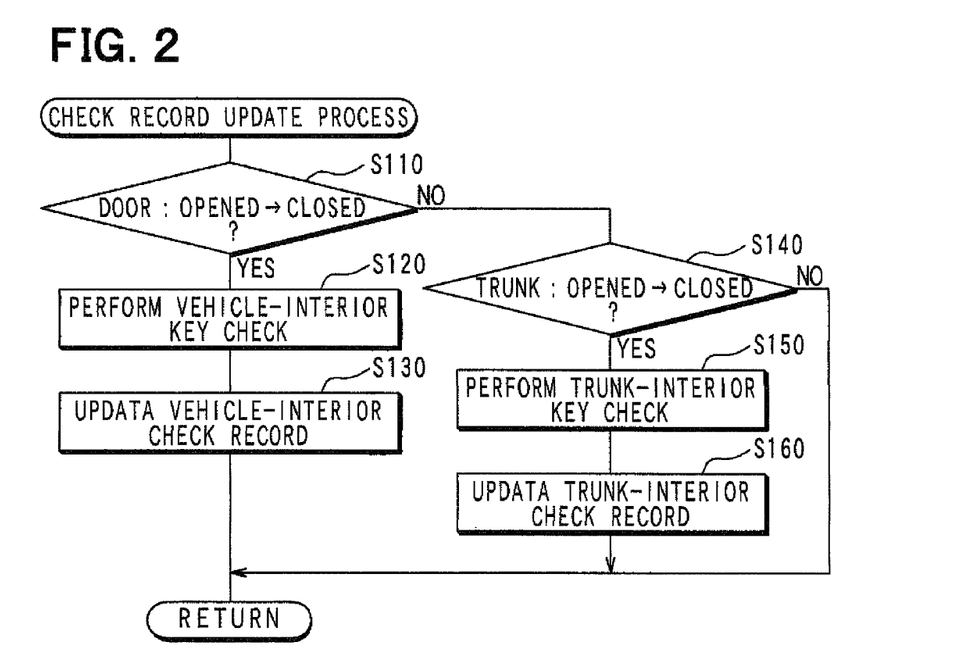
FIG. 2 is a flow diagram of a check record update process performed by a control ECU of the door lock control apparatus.

FIG. 2 illustrates a check record update process performed by the control ECU 10 before the door lock switch 26 is operated by the user. In the check record update process, the control ECU 10 checks whether the electronic key 2 is located inside the vehicle and stores a record of the check.

As shown in FIG. 2, the check record update process starts at S110, where the control ECU 10 determines, based on a detection signal from the door sensor 24, whether the door of the vehicle is opened and then closed. Specifically, at S110, the control ECU 10 determines whether the door is closed after the door was previously opened so that the electronic key 2 can be put into a situation in which the electronic key 2 can be moved from inside to outside the occupant compartment.

If the control ECU 10 determines that the door has been opened and then closed corresponding to YES at S110, the check record update process proceeds to S120, where the control ECU 10 performs a vehicle-interior key check procedure. In the vehicle-interior key check procedure, the vehicle-interior transmitter 12 transmits the call signal inside the occupant compartment, the receiver 18 receives the response signal from the electronic key 2, and the control ECU 10 checks whether the electronic key 2 is located inside the occupant compartment by determining whether the response signal received by the receiver 18 is authorized. Then, the check record update process proceeds from S120 to S130, where the control ECU 10 stores a result of the vehicle-interior key check procedure as a vehicle-interior check record. For example, the result of the vehicle-interior key check procedure can be stored in a memory incorporated in the control ECU 10. After S130 is finished, the check record update process returns to S110.

Conversely, if the control ECU 10 does not determine that the door is opened and then closed corresponding to NO at S110, the check record update process proceeds to S140, where the control ECU 10 determines, based on a detection signal from the trunk sensor 28, whether the trunk of the vehicle has been opened and then closed. Specifically, at S140, the control ECU 10 determines whether the trunk is closed after the trunk was previously opened so that the electronic key 2 can be put into a situation in which the electronic key 2 can be moved from inside to outside the trunk.

If the control ECU 10 does not determine that the trunk has been opened and then closed corresponding to NO at S140, the check record update process returns to S110.

Conversely, if the control ECU 10 determines that the trunk has been opened and then closed corresponding to YES at S140, the check record update process proceeds to S150, where the control ECU 10 performs a trunk-interior key check procedure. In the trunk-interior key check procedure, the trunk-interior transmitter 14 transmits the call signal inside the trunk, the receiver 18 receives the response signal from the electronic key 2, and the control ECU 10 checks whether the electronic key 2 is located inside the trunk by determining whether the response signal received by the receiver 18 is authorized. Then, the check record update process proceeds to S160, where the control ECU 10 stores a result of the trunk-interior key check procedure as a trunk-interior check record. For example, the result of the trunk-interior key check procedure can be stored in the memory incorporated in the control ECU 10. After S160 is finished, the check record update process returns to S110.

In this way, the check record update process is repeated so that the vehicle-interior and trunk-interior check records stored in the memory can be updated.

Figure 3:
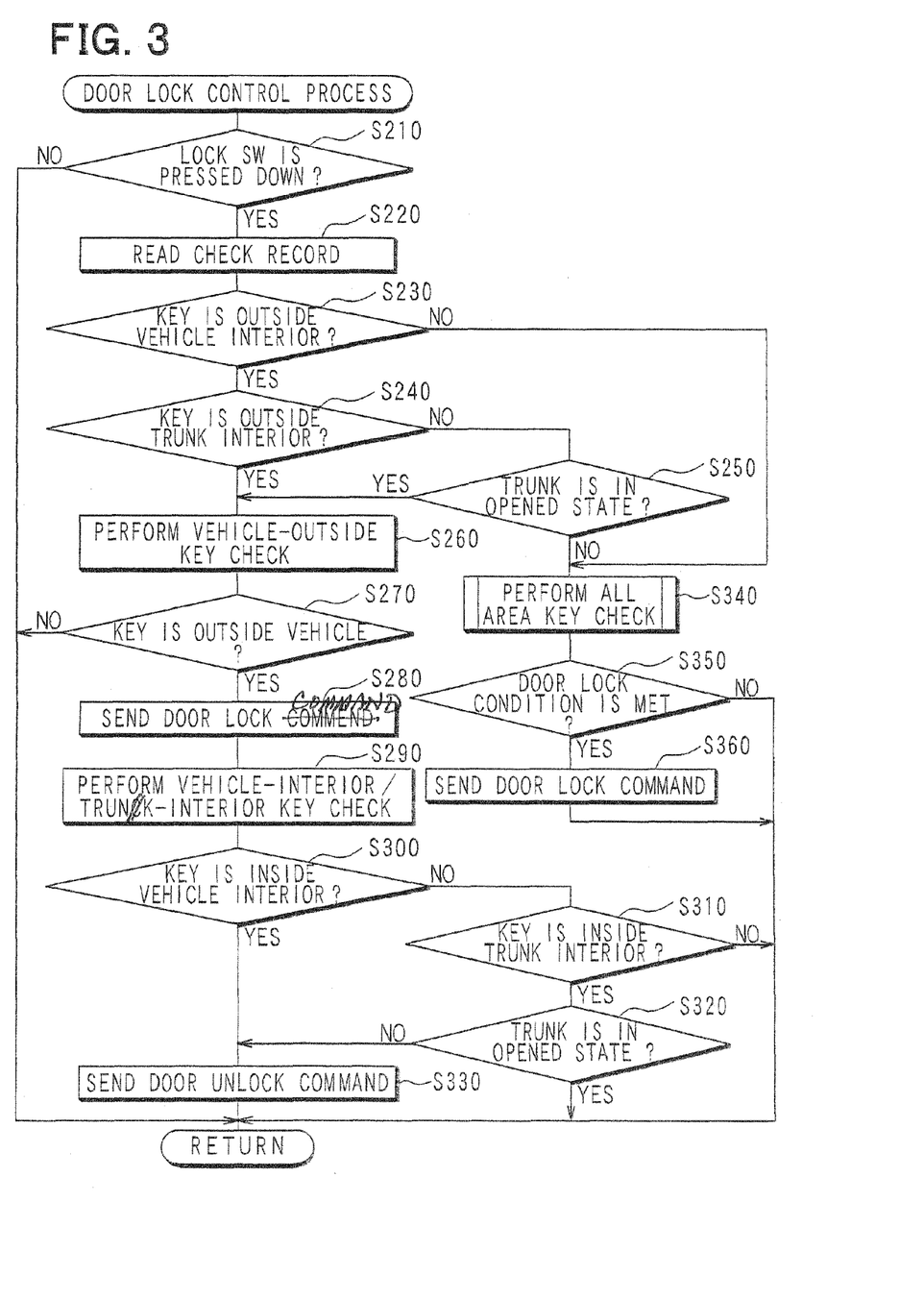
FIG. 3 is a flow diagram of a door lock control process performed by the control ECU.

FIG. 3 illustrates a door lock control process performed by the control ECU 10. The door lock control process is performed, when the door lock switch 26 provided on the exterior of the vehicle is operated (e.g., pressed down). In the door lock control process, the control ECU 10 locks/unlocks the door of the vehicle based on whether the door lock condition is met.

As shown in FIG. 3, the door lock control process starts at S210, where the control ECU 10 determines whether the door lock switch 26 is pressed down. If the control ECU 10 does not determine that the door lock switch 26 is pressed down corresponding to NO at S210, the door lock control process ends. Conversely, if the control ECU 10 determines that the door lock switch 26 is pressed down corresponding to YES at S210, the door lock control process proceeds to S220. At S220, the control ECU 10 reads the updated vehicle-interior and trunk-interior check records, for example, from the memory.

Then, the door lock control process proceeds to S230, where the control ECU 10 determines, based on the vehicle-interior check record, whether the electronic key 2 is located outside the occupant compartment. If the control ECU 10 determines that the electronic key 2 is located inside the occupant compartment corresponding to NO at S230, the door lock control process proceeds to S340. Conversely, if the control ECU 10 determines that the electronic key 2 is located outside the occupant compartment corresponding to YES at S230, the door lock control process proceeds to S240.

At S240, the control ECU 10 determines, based on the trunk-interior check record, whether the electronic key 2 is located inside the trunk of the vehicle. If the control ECU 10 determines that the electronic key 2 is located inside the trunk corresponding to NO at S240, the door lock control process proceeds to S250. Conversely, if the control ECU 10 determines that the electronic key 2 is located outside the trunk corresponding to YES at S240, the door lock control process proceeds to S260.

At S250, the control ECU 10 determines whether the trunk is now opened. If the control ECU 10 determines that the trunk is now closed corresponding to NO at S250, the door lock control process proceeds to S340. Conversely, if the control ECU 10 determines that the trunk is now opened corresponding to YES at S250, the door lock control process proceeds to S260.

At S260, the control ECU 10 performs a vehicle-outside key check procedure. In the vehicle-outside key check procedure, the vehicle-outside transmitter 16 transmits the call signal to the outside of the vehicle, the receiver 18 receives the response signal from the electronic key 2, and the control ECU 10 checks whether the electronic key 2 is located outside the vehicle by determining whether the response signal received by the receiver 18 is authorized. That is, in the vehicle-outside key check procedure, the control ECU 10 determines whether a user carrying the electronic key 2 is near the vehicle.

Then, the door lock control process proceeds from S260 to S270, where the control ECU 10 determines, based on a result of the vehicle-outside key check procedure, whether the electronic key 2 is located outside the vehicle. If the control ECU 10 determines that the electronic key 2 is located outside the vehicle corresponding to YES at S270, the door lock control process proceeds to S280. Conversely, if the control ECU 10 does not determine that the electronic key 2 is located outside the vehicle corresponding to NO at S270, the door lock control process ends.

At S280, the control ECU 10 sends the door lock command to the door lock mechanism 22 so that the door of the vehicle can be locked. That is, the door lock condition is considered as met, when the control ECU 10 determines that the electronic key 2 is located outside the occupant compartment corresponding to YES at S230, that the electronic key 2 is located outside the trunk corresponding to YES at S240, and that the electronic key 2 is located outside around the vehicle corresponding to YES at S270.

Then, the door lock control process proceeds from S280 to S290. At S290, the control ECU 10 performs the vehicle-interior key check procedure and the trunk-interior key check procedure in the same manner as at S120 and S150.

Then, the door lock control process proceeds from S290 to S300, where the control ECU 10 determines, based on a result of the vehicle-interior key check procedure performed at S290, whether the electronic key 2 is located inside the occupant compartment. If the control ECU 10 determines that the electronic key 2 is located inside the occupant compartment corresponding to YES at S300, the door lock control process proceeds to S330. At S330, the control ECU 10 sends a door unlock command to the door lock mechanism 22 so that the door of the vehicle can be unlocked. After S330 is finished, the door lock control process ends.

Conversely, if the control ECU 10 does not determine that the electronic key 2 is located inside the occupant compartment corresponding to NO at S300, the door lock control process proceeds to S310. At S310, the control ECU 10 determines, based on a result of the trunk-interior key check procedure performed at S290, whether the electronic key 2 is located inside the trunk.

If the control ECU 10 determines that the electronic key 2 is located inside the trunk of the vehicle corresponding to YES at S310, the door lock control process proceeds to S320. Conversely, if the control ECU 10 determines that the electronic key 2 is located outside the trunk of the vehicle corresponding to NO at S310, the door lock control process ends.

At S320, the control ECU 10 determines whether the trunk is now opened. If the control ECU 10 determines that the trunk is now closed corresponding to NO at S320, the door lock control process proceeds to S330, where the control ECU 10 sends the door unlock command to the door lock mechanism 22 so that the door of the vehicle can be unlocked.

Conversely, if the control ECU 10 determines that the trunk is now opened corresponding to YES at S320, the door lock control process ends.

As mentioned previously, the door lock control process proceeds to S340, if the control ECU 10 determines that the electronic key 2 is located inside the occupant compartment corresponding to NO at S230, or if the control ECU 10 determines that the trunk is now closed corresponding to NO at S250. At S340, the control ECU 10 performs an all area key check procedure. In the all area key check procedure, the control ECU 10 performs all of the vehicle-interior key check procedure, the trunk-interior key check procedure, and the vehicle-outside key check procedure in the same manner as at S260 and S290.

Then, the door lock control process proceeds from S340 to S350, where the control ECU 10 determines, based on a result of the all area key check procedure performed at S340, whether the door lock condition is met. As mentioned previously, the door lock condition is considered as met, when the control ECU 10 determines that the electronic key 2 is located outside the occupant compartment. If the control ECU 10 does not determine that the door lock condition is met corresponding to NO at S350, the door lock control process ends. Conversely, if the control ECU 10 determines that the door lock condition is met corresponding to YES at S350, the door lock control process proceeds to S360. At S360, the control ECU 10 sends the door lock command to the door lock mechanism 22 so that the door of the vehicle can be locked. After S360 is finished, the door lock control process ends.

Figure 4:
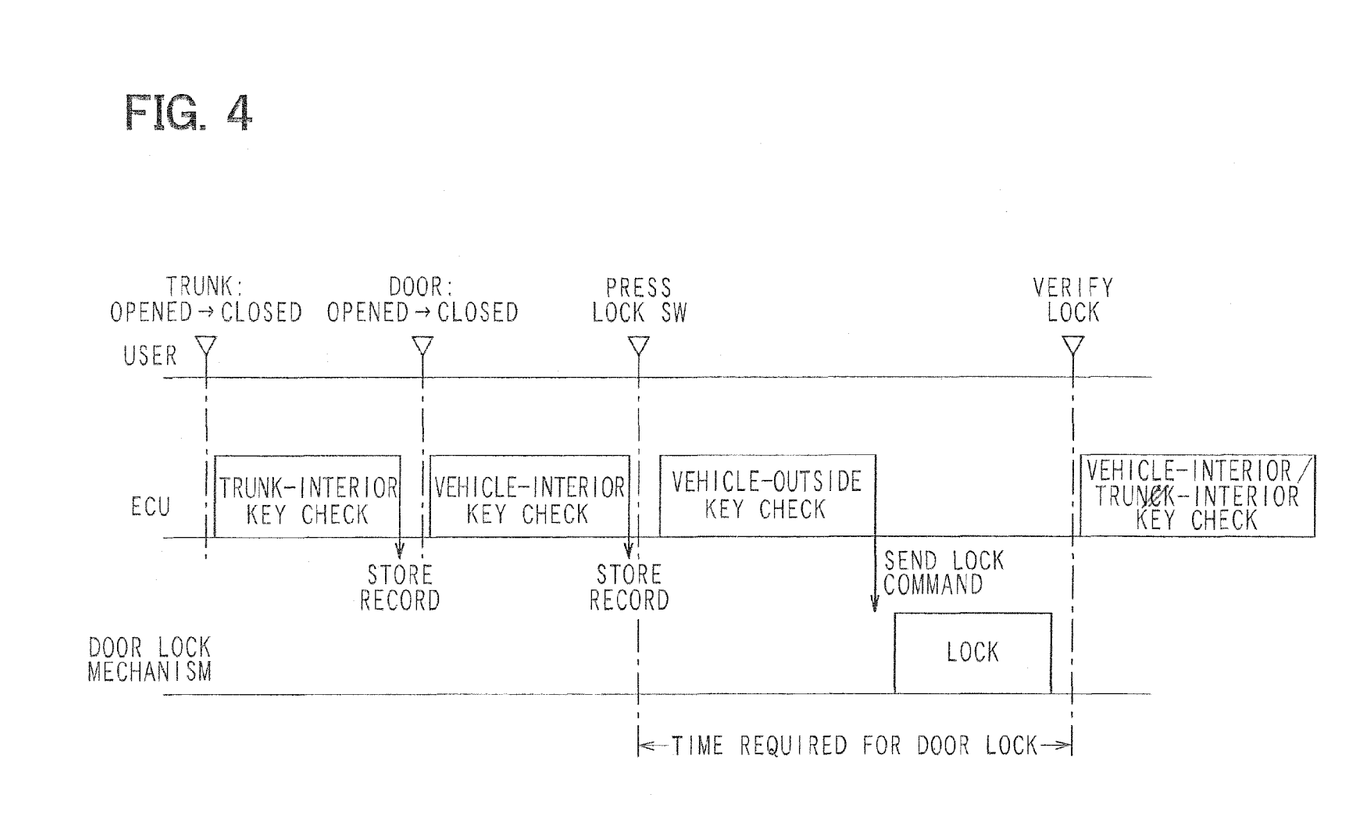
FIG. 4 is a timing diagram of the door lock control apparatus.

FIG. 4 is a timing diagram of the door lock control apparatus according to the embodiment. As shown in FIG. 4, in the door lock control apparatus, regardless of the operating state of the door lock switch 26, the trunk-key check procedure is performed when the trunk is opened and then closed, and the vehicle-interior key check procedure is performed when the door is opened and then closed. In this way, it is checked whether the electronic key 2 is located inside the vehicle, and the results of the check procedures are stored as the check records.

When the door lock switch 26 is operated, the vehicle-outside key check procedure is performed to check whether the electronic key 2 is located around the vehicle. If it is determined that the electronic key 2 is located around the vehicle and the check record of the key 2 is not located inside the vehicle, it is determined that the door lock condition is met. When the door lock condition is met, the door lock command is sent to the door lock mechanism 22 so that the door of the vehicle can be locked.

In such an approach, time required to verify the door of the vehicle are locked after the door lock switch 26 is operated is reduced so that usability can be improved. That is, as can be seen by comparing FIGS. 4 and 5, the time required for door lock in the door lock control apparatus of the embodiment is less than the time required for door lock in the conventional door lock control apparatus.

Further, according to the embodiment, after the doors of the vehicle are locked in response to the operation of the door lock switch 26, the vehicle-interior key check procedure and the trunk-key check procedure are performed to check whether the electronic key is left inside the vehicle. If the electronic key is left inside the vehicle, the door unlock command is sent to the door lock mechanism 22 so that the door can be unlocked (refer to S290-S330 in FIG. 3).

In such an approach, even if the door is locked due to the fact that the stored check records have errors caused by factors such as noise and an unexpected operation of the user, the door can be unlocked. Thus, it is possible to prevent the door from being locked with the electronic key 2 left inside the vehicle.

Furthermore, according to the embodiment, when the stored check records indicate that the door lock condition is not met, the all area key check procedure is performed. If the result of the all area key check procedure indicates that the door lock condition is met, the door of the vehicle is locked (refer to S340-S360 in FIG. 3) regardless of the stored check records.

In this way, even if the door is not locked due to the fact that the stored check records have errors caused by factors such as noise and an unexpected operation of the users the door can be locked by performing the all area key check procedure. Thus, usability can be improved.

The control ECU 10 can serve as a door lock control device by performing the door lock control process shown in FIG. 3. The control ECU 10 can serve as a vehicle-interior check device by performing S110-S130 of the check record update process shown in FIG. 2. The control ECU 10 can serve as a trunk-interior check device by performing S140-S160 of the check record update process shown in FIG. 2. The control ECU 10 can serve as a door unlock control device by performing S290-S330 of the door lock control process shown in FIG. 3.

The embodiments described above can be modified in various ways. For example, the trunk-interior key check procedure can be omitted. In such a case, it can be determined whether the door lock condition is met based on the results of the vehicle-interior key check procedure and the vehicle-outside key check procedure.

Such changes and modifications are to be understood as being within the scope of the present invention as defined by the appended claims.

What is claimed is:

1. A door lock control apparatus for a vehicle comprising:
a lock switch adapted to be located on an exterior of the vehicle, the lock switch being configured to be manually operable to input a door lock command;
a door lock control device configured to perform a vehicle-outside key check in response to the door lock command, the vehicle-outside key check transmitting a wireless signal outside around the vehicle and determining whether an electronic key specific to the vehicle is located outside around the vehicle based on a response signal from the electronic key;
a vehicle-interior check device configured to perform a vehicle-interior key check when the electronic key was previously put into a situation in which the electronic key may have been moved from inside to outside an occupant compartment of the vehicle, the vehicle-interior key check transmitting the wireless signal inside the occupant compartment and determining whether the electronic key is currently located inside the occupant compartment based on the response signal from the electronic key, the vehicle-interior check device storing a result of the vehicle-interior key check as a vehicle-interior check record; and
a trunk-interior check device congifured to perform a trunk-interior key check when a trunk of the vehicle has been closed, the trunk-interior key check transmitting the wireless signal inside the trunk and determining whether the electronic key is located inside the trunk based on the response signal from the electronic key, the trunk-interior check device storing a result of the trunk-interior key check as a trunk-interior check record, wherein the door lock control device determines, based on the previously stored vehicle-interior check record, whether the electronic key is located inside the occupant compartment in response to the door lock command, and the door lock control device locks the door of the vehicle upon determination that the electronic key is not located inside the occupant compartment, and that the electronic key is located outside around the vehicle, the door lock control device determines, based on the previously stored vehicle-interior check record and the previously stored trunk-interior check record, whether the electronic key is located inside either the occupant compartment or the trunk, the door lock control device locks the door upon determination that the electronic key is not located inside either the occupant compartment or the trunk, and that the electronic key is located outside around the vehicle, and when the trunk is in an opened state, the door lock control device determines whether to lock the door based on the previously stored vehicle-interior check record and a result of the vehicle-outside key check without using the previously stored trunk-interior check record.

2. The door lock control apparatus according to claim 1, further comprising:
a door unlock control device configured to transmit the wireless signal inside the occupant compartment when the door lock control device locks the door, the door unlock control device determining whether the electronic key is located inside the occupant compartment based on the response signal from the electronic key, the door unlock control device unlocking the door upon determination that the electronic key is located inside the occupant compartment.

3. The door lock control apparatus according to claim 2, wherein
the door unlock control device transmits the wireless signal inside the occupant compartment and the trunk when the door lock control device locks the door, the door unlock control device determining whether the electronic key is located inside either the occupant compartment or the trunk based on the response signal from the electronic key, the door unlock control device unlocking the door upon determination that the electronic key is located inside either the occupant compartment or the trunk.

4. The door lock control apparatus according to claim 3, wherein
when the trunk is in an opened state, the door unlock control device is prohibited from unlocking the door even if it is determined that the electronic key is located inside the trunk.

5. A door lock control apparatus for a vehicle comprising:
a lock switch adapted to be located on an exterior of the vehicle, the lock switch being configured to be manually operable to input a door lock command;
a door lock control device configured to perform a vehicle-outside key check in response to the door lock command, the vehicle-outside key check transmitting a wireless signal outside around the vehicle and determining whether an electronic key specific to the vehicle is located outside around the vehicle based on a response signal from the electronic key;
a vehicle-interior check device configured to perform a vehicle-interior key check when the electronic key was previously put into a situation in which the electronic key may have been moved from inside to outside an occupant compartment of the vehicle, the vehicle-interior key check transmitting the wireless signal inside the occupant compartment and determining whether the electronic key is currently located inside the occupant compartment based on the response signal from the electronic key, the vehicle-interior check device storing a result of the vehicle-interior key check as a vehicle-interior check record, wherein the door lock control device determines, based on the previously stored vehicle-interior check record, whether the electronic key is located inside the occupant compartment in response to the door lock command, the door lock control device locks the door of the vehicle upon determination that the electronic key is not located inside the occupant compartment, and that the electronic key is located outside around the vehicle, when the door unlock control device determines, based on the previously stored vehicle-interior check record, that the electronic key is located inside the occupant compartment, the vehicle-interior check device reperforms the vehicle-interior key check, the door lock control device redetermines, based on a result of the reperformed vehicle-interior key check, whether the electronic key is located inside the occupant compartment, and the door lock control device locks the door upon redetermination that the electronic key is not located inside the occupant compartment and is located outside around the vehicle.

6. A door lock control apparatus for a vehicle comprising:

a lock switch adapted to be located on an exterior of the vehicle, the lock switch being configured to be manually operable to input a door lock command;

a door lock control device configured to perform a vehicle-outside key check in response to the door lock command, the vehicle-outside key check transmitting a wireless signal outside around the vehicle and determining whether an electronic key specific to the vehicle is located outside around the vehicle based on a response signal from the electronic key;

a vehicle-interior check device configured to perform a vehicle-interior key check when the electronic key was previously put into a situation in which the electronic key may have been moved from inside to outside an occupant compartment of the vehicle, the vehicle-interior key check transmitting the wireless signal inside the occupant compartment and determining whether the electronic key is currently located inside the occupant compartment based on the response signal from the electronic key, the vehicle-interior check device storing a result of the vehicle-interior key check as a vehicle-interior check record;

a trunk-interior check device configured to perform a trunk-interior key check when a trunk of the vehicle has been closed, the trunk-interior key check transmitting the wireless signal inside the trunk and determining whether the electronic key is located inside the trunk based on the response signal from the electronic key, the trunk-interior check device storing a result of the trunk-interior key check as a trunk-interior check record, the door lock control device determines, based on the previously stored vehicle-interior check record, whether the electronic key is located inside the occupant compartment in response to the door lock command, the door lock control device locks the door of the vehicle upon determination that the electronic key is not located inside the occupant compartment, and that the electronic key is located outside around the vehicle, when the door lock control device determines, based on either the previously stored vehicle-interior check record or the previously stored trunk-interior check record, that the electronic key is located inside either the occupant compartment or the trunk, the vehicle-interior check device and the trunk-interior check device respectively reperform the vehicle-interior key check and the trunk-interior key check, and the door lock control device locks the door upon redetermination that the electronic key is not located inside either the occupant compartment or the trunk and is located outside around the vehicle.

* * * * *

UNITED STATES PATENT AND TRADEMARK OFFICE
CERTIFICATE OF CORRECTION

PATENT NO.          : 8,717,142 B2
APPLICATION NO.     : 12/550887
DATED               : May 6, 2014
INVENTOR(S)         : Satoshi Nagao et al.

It is certified that error appears in the above-identified patent and that said Letters Patent is hereby corrected as shown below:

On the title page under item (73) Assignee, add the following second assignee:

TOYOTA JIDOSHA KABUSHIKI KAISHA, Toyota-City, Aichi-Pref., Japan

Signed and Sealed this
Twenty-first Day of July, 2015

Michelle K. Lee
*Director of the United States Patent and Trademark Office*

UNITED STATES PATENT AND TRADEMARK OFFICE
CERTIFICATE OF CORRECTION

Page 1 of 5

PATENT NO.         : 8,717,142 B2
APPLICATION NO.    : 12/550887
DATED              : May 6, 2014
INVENTOR(S)        : Nagao et al.

It is certified that error appears in the above-identified patent and that said Letters Patent is hereby corrected as shown below:

Delete the title page and substitute therefore with the attached title page consisting of the corrected illustrative figure.

In the drawings

Replace FIGS. 3-5 with FIGS. 3-5 as shown on the attached pages.

Signed and Sealed this
Fifth Day of April, 2016

Michelle K. Lee
*Director of the United States Patent and Trademark Office*

(12) United States Patent
Nagao et al.

(10) Patent No.: US 8,717,142 B2
(45) Date of Patent: May 6, 2014

(54) DOOR LOCK CONTROL APPARATUS FOR VEHICLE (75) Inventors: Satoshi Nagao, Kariya (JP); Hironori Mitsubayashi, Chita-gun (JP); Daigo Akutsu, Gifu (JP); Taichi Yamaguchi, Obu (JP); Mitsuru Ogawa, Kariya (JP); Tomoo Kakegawa, Toyota (JP); Hiroko Murakami, Toyota (JP); Tomoyuki Funayama, Toyota (JP)

(73) Assignee: Denso Corporation, Aichi-Pref., Kariya (JP)

( * ) Notice: Subject to any disclaimer, the term of this patent is extended or adjusted under 35 U.S.C. 154(b) by 729 days.

(21) Appl. No.: 12/550,887

(22) Filed: Aug. 31, 2009

(65) Prior Publication Data
US 2010/0050713 A1  Mar. 4, 2010

(30) Foreign Application Priority Data
Sep. 2, 2008  (JP) ................. 2008-224976

(51) Int. Cl.
G08C 19/00 (2006.01)

(52) U.S. Cl.
USPC .... 340/5.72; 340/5.61; 340/5.62; 340/426.36

(58) Field of Classification Search
USPC ............ 340/5.72, 5.61, 5.62, 426.36, 426.16, 340/426.28, 426.29
See application file for complete search history.

(56) References Cited

U.S. PATENT DOCUMENTS

| | | | |
|---|---|---|---|
| 5,499,022 A * | 3/1996 | Boschini | 340/5.62 |
| 5,912,631 A * | 6/1999 | Kusunoki | 340/5.64 |
| 6,906,612 B2 * | 6/2005 | Ghabra et al. | 340/5.61 |
| 7,181,189 B2 | 2/2007 | Hotta et al. | |
| 8,089,342 B2 | 1/2012 | Sugiura et al. | |
| 2002/0030410 A1 | 3/2002 | Katou et al. | |
| 2006/0279402 A1* | 12/2006 | Okamitsu et al. | 340/5.62 |
| 2007/0120645 A1* | 5/2007 | Nakashima | 340/5.61 |
| 2008/0157919 A1* | 7/2008 | Sugiura et al. | 340/5.61 |

FOREIGN PATENT DOCUMENTS

| | | |
|---|---|---|
| JP | 3192715 | 5/2001 |
| JP | 3230469 | 9/2001 |
| JP | 2004-019380 | 1/2004 |
| JP | 3582384 | 8/2004 |
| JP | 2005-097860 | 4/2005 |
| JP | 2007107343 | 4/2007 |
| JP | 2007-217968 | 8/2007 |
| JP | 2007303254 | 11/2007 |
| JP | 2008-163633 | * 7/2008 |

OTHER PUBLICATIONS

Office Action mailed Nov. 16, 2012 in JP 2008-224976 with English translation.

* cited by examiner

Primary Examiner — Edwin Holloway, III
(74) Attorney, Agent, or Firm — Nixon & Vanderhye PC (57) ABSTRACT

A door lock control apparatus includes a lock switch on an exterior of a vehicle, a controller, and a check device. The controller performs a first key check in response to a lock command inputted through the lock switch. The first key check determines whether an electronic key specific to the vehicle is located outside around the vehicle based on a response from the key. The check device has previously performed a second key check, after the key has been put into a situation in which the key might have been moved from inside to outside the vehicle. The second key check determines whether the key is located inside the vehicle based on the response from the key. The check device stores a result of the second key check as a stored check record, which is then immediately available for checking when the controller responds to an inputted lock command.

6 Claims, 4 Drawing Sheets

FIG. 3

FIG. 4